G. D. PARKER.
FRUIT SORTING OR GRADING APPARATUS.
APPLICATION FILED NOV. 26, 1915.
1,202,574.
Patented Oct. 24, 1916.
2 SHEETS—SHEET 1.
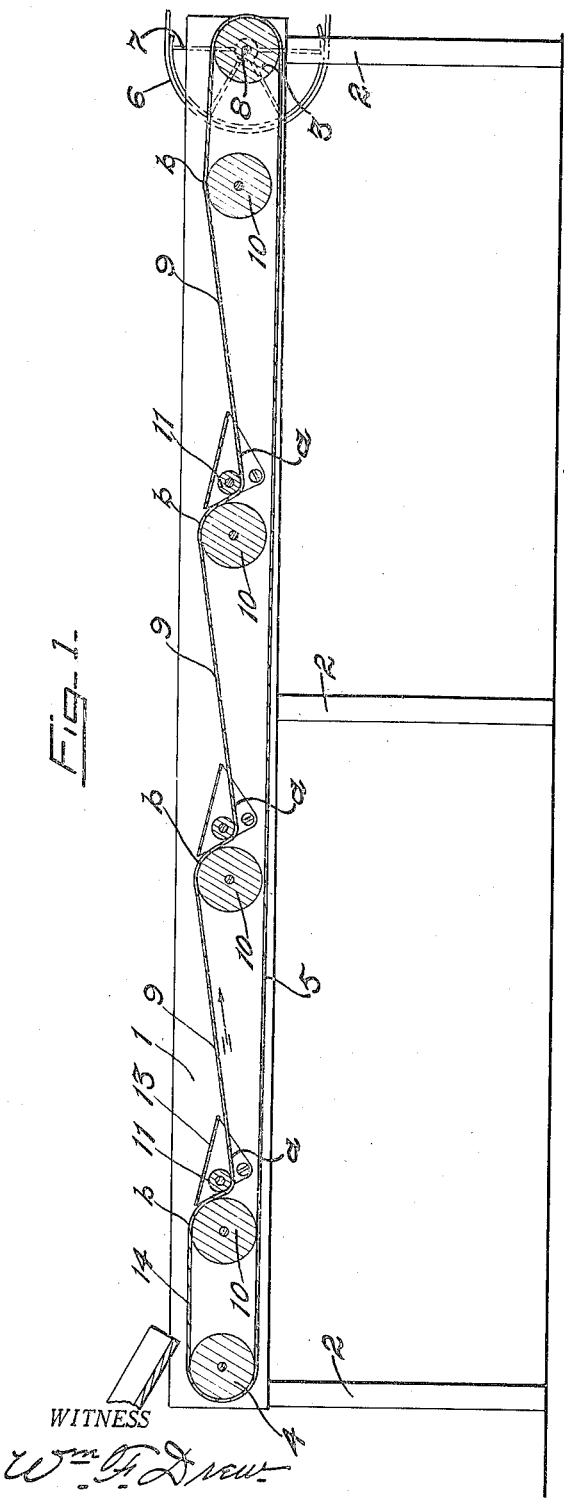
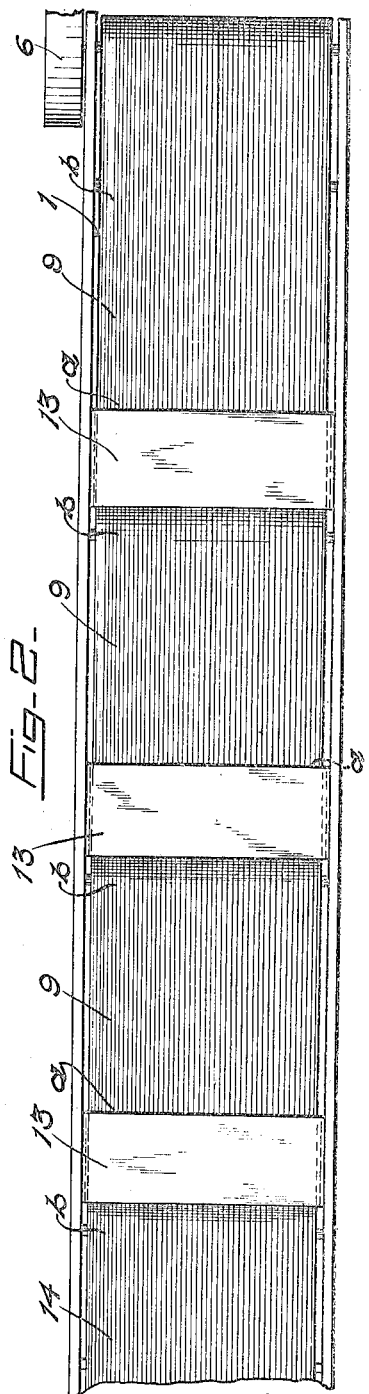
WITNESS
INVENTOR.
BY
ATTORNEYS.

G. D. PARKER.
FRUIT SORTING OR GRADING APPARATUS.
APPLICATION FILED NOV. 26, 1915.
1,202,574.
Patented Oct. 24, 1916.
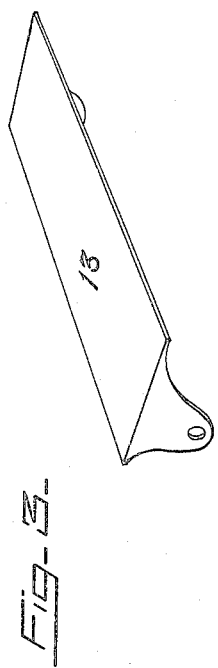
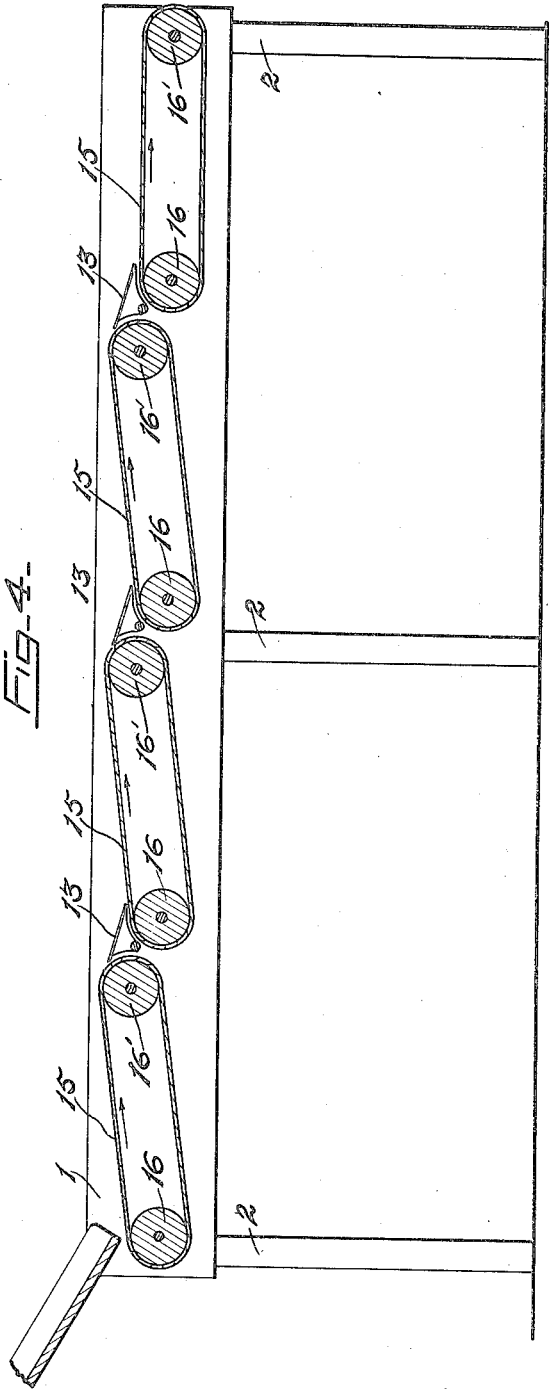

UNITED STATES PATENT OFFICE.

GEORGE D. PARKER, OF RIVERSIDE, CALIFORNIA.

FRUIT SORTING OR GRADING APPARATUS.

1,202,574.

Specification of Letters Patent.

Patented Oct. 24, 1916.

Application filed November 26, 1915. Serial No. 63,618.

*To all whom it may concern:*

Be it known that I, GEORGE D. PARKER, a citizen of the United States, residing at Riverside, in the county of Riverside and State of California, have invented certain new and useful Improvements in Fruit Sorting or Grading Apparatus, of which the following is a specification.

The hereinafter described invention while applicable for use in the grading or sorting of fruit generally, is designed for use more particularly in fruit establishments engaged in the packing of lemons and oranges, and the object thereof is to facilitate the operation of sorting or grading of the fruit as moved toward the operator or operators situated alongside the apparatus for the removal of the bad, bruised or damaged fruit from the stream of fruit conveyed therethrough.

The invention relates to that class of fruit graders set forth and described in United States Letters Patent No. 1,030,479, granted N. J. Ofstad under date of June 25th, 1912, and the same resides specifically in the arrangement of the conveyer for propelling the fruit in such a manner as to provide a series of interrupted upwardly inclined sections throughout the length thereof, over and up which sections the fruit to be graded moves as propelled by one inclined section toward the depressed or receiving end of an adjacent inclined section, the conveyer sections being each inclined at an angle of repose for fruit thereon to be elevated by frictional contact therewith.

To comprehend the invention reference should be had to the accompanying drawings, wherein—

Figure 1 is a vertical longitudinal sectional view of the improved sorting or grading apparatus. Fig. 2 is a plan view of the same. Fig. 3 is a detail perspective view of one of the fruit turners. Fig. 4 is a view similar to Fig. 1 illustrating a modified form of the device.

In the drawings, the numeral 1 designates any suitable form of a longitudinally disposed runway for the fruit, and 2 a supporting frame for said runway. The said frame 2 at the ends thereof support in suitable bearings the drums 3 and 4, over which works the endless fruit conveyer 5, the drum 3 constituting the drive member for the conveyer belt 5, and having rotation imparted thereto from any suitable source of outside power, as, for instance, by a power belt 6 working over the belt pulley 7 secured to the shaft 8 for the drum 3.

The conveyer belt 5 in the preferred embodiment thereof extends throughout the length of the runway 1 and the upper run thereof is so arranged as to provide a series of upwardly inclined sections 9, the upward inclination of each of said sections being approximately two inches from the receiving end *a* thereof to the discharge end *b*, the inclination thus provided being an angle of repose for the fruit received onto the said inclined sections. From the discharge end *b* of one section 9 to the receiving end *a* of an adjacent inclined section there is a drop or fall of approximately two inches. The upper run of the said endless conveyer belt 5 is therefore a stepped one, which stepping is effected by a series of spaced transverse rollers 10 journaled in the walls of the runway 1 and a series of transverse rollers 11 of less diameter than the rollers 10; also journaled in the frame of the runway 1. The rollers 11 are arranged adjacent to and in spaced relation to the rollers 10, and the disposition of the rollers 11 is such as to depress the conveyer belt at such points to a distance of about two inches below the upper surface of the rollers 10, the conveyer belt being trained over the rollers 10 and under the rollers 11. Under this construction the endless belt conveyer travels at an upward inclination from the smaller rollers 11 to the larger rollers 10.

Within the runway 1 a series of downward inclined deflector plates 13 are situated, the same bridging the rollers 11 and serving to convey the fruit from the discharge point *b* of one inclined section 9 to a point adjacent to the receiving end point *a* for the fruit onto an adjacent inclined section 9 of the conveyer belt 1. These inclined plates 13 not only serve to gradually guide the fruit from one inclined section of the conveyer belt onto an adjacent inclined section thereof and thereby preventing the tendency of bruising the fruit which would probably take place if permitted to drop a distance of two inches, but they serve to cause the fruit to roll from one section onto an adjacent section of the conveyer belt and which rolling exposes all portions of the fruit surface to the eye of the operator, so that he may readily note a damaged or bruised fruit and sort the same from the remaining fruit.

The purpose of providing the upwardly inclined sections to the traveling conveyer for the fruit, is to dispose of the necessity of the operator or operators remaining positioned at the deflector plates during the sorting or grading operation, thereby giving a greater range for the sorting operation. As the fruit is being carried up the inclined sections of the conveyer by frictional contact therewith, the operator, by a slight pressure on the fruit, is enabled to cause the same to roll down the incline of such section, and during such rolling movement the operator is enabled to select or sort the damaged or bruised fruit from the good fruit. As each inclined section of the conveyer belt is approximately seven feet in length as against two and one-half to three feet of the deflector plates 13, and as each section is disposed at such an inclination to the horizontal as to provide an angle of repose for the fruit resting thereon, it is obvious that a greater range of sorting space is provided for the operator, and by reason thereof a greater number of operators may be employed at the sorting table.

The fruit to be sorted is fed onto the forward horizontal section 14 of the conveyer belt in any suitable manner, and the graded fruit leaving the last inclined section 9 is conveyed to any suitable place of discharge.

In place of a single conveyer belt of the endless type, a series of short upwardly inclined traveling endless belts 15 each disposed at a slight inclination so as to secure an angle of repose for fruit thereon to be elevated may be employed, arranged end to end throughout the length of the runway, and each traveling over the rollers 16 and 16' arranged in different planes within and throughout the length of the runway. The fruit discharging from one inclined traveling belt enters onto the downwardly inclined deflecting plate 13 and is delivered thereby onto the receiving end of an adjacent conveyer belt. Such a form of construction of the conveying member is disclosed by Fig. 4 of the drawings, and the same to all intent and purpose constitutes a conveyer consisting of a series of upwardly inclined sections extended throughout the length of the fruit runway. Under this arrangement it will be understood that the rollers over which the belts travel are rotated in unison, power for rotating the same being applied thereto in any suitable manner.

Having thus described my invention, what I claim as new and desire to protect by Letters Patent is:—

1. A fruit sorting apparatus comprising a suitable supporting structure provided with a fruit-way, an imperforated endless fruit conveyer working within said runway and having its upper run formed into a series of sections upwardly inclined at an angle of repose for fruit thereon for the reception and elevation of the fruit to be sorted and providing an unobstructed stepped surface to said conveyer, and a deflector interposed between the elevated discharge end portion of one inclined section and the lower receiving end of an adjacent section.

2. A fruit sorting apparatus comprising a suitable supporting structure provided with a fruitway, an imperforated endless traveling fruit conveyer belt working therein and so disposed as to provide a series of end to end sections each upwardly inclined at an angle of repose for fruit thereon and providing an unobstructed stepped conveying surface within the fruit-runway, and means interposed between said sections for conveying fruit from the elevated discharge end of one section onto the lower receiving end of an adjacent section.

3. A fruit sorting apparatus, the same comprising a horizontally disposed fruit runway, a series of interrupted end to end endless traveling fruit conveying sections arranged within said runway and each upwardly inclined at an angle of repose for fruit thereon, and fixed means interposed between the said sections for receiving fruit from the elevated discharge end of one section and discharging the same onto the lower receiving end of an adjacent section.

4. A fruit sorting apparatus comprising a suitable supporting structure provided with a fruit runway, an endless conveyer consisting of a series of end to end sections arranged within the runway and each of said sections being upwardly inclined at a angle of repose for fruit thereon, whereby the fruit received thereon is elevated by frictional contact therewith and free to roll downwardly thereof on frictional contact being destroyed.

In testimony whereof I have signed my name to this specification in the presence of two subscribing witnesses.

GEORGE D. PARKER.

Witnesses:
N. A. ACKER,
D. B. RICHARDS.